Nov. 12, 1963

J. E. DALGLEISH 3,110,141

METHOD FOR MAKING ARTICLES

Filed June 2, 1960

INVENTOR.
JOHN E. DALGLEISH
BY
Teare & Fetzer
ATTORNEYS

Nov. 12, 1963  J. E. DALGLEISH  3,110,141
METHOD FOR MAKING ARTICLES
Filed June 2, 1960  6 Sheets-Sheet 2

INVENTOR.
JOHN E. DALGLEISH
BY
Teare + Felzer
ATTORNEYS

Nov. 12, 1963  J. E. DALGLEISH  3,110,141
METHOD FOR MAKING ARTICLES
Filed June 2, 1960  6 Sheets-Sheet 3

INVENTOR.
JOHN E. DALGLEISH
BY
Teare & Fetzer
ATTORNEYS

INVENTOR.
JOHN E. DALGLEISH
BY
Teare & Feijen
ATTORNEYS

INVENTOR.
JOHN E. DALGLEISH
BY
Teare & Fetzer
ATTORNEYS

Nov. 12, 1963     J. E. DALGLEISH     3,110,141

METHOD FOR MAKING ARTICLES

Filed June 2, 1960     6 Sheets-Sheet 6

INVENTOR.
JOHN E. DALGLEISH
BY
Teare & Fetzer
ATTORNEYS

United States Patent Office 3,110,141
Patented Nov. 12, 1963

3,110,141
METHOD FOR MAKING ARTICLES
John E. Dalgleish, 4501 SW. 24th St.,
Fort Lauderdale, Fla.
Filed June 2, 1960, Ser. No. 33,443
4 Claims. (Cl. 51—323)

This invention relates to a method for making turbine blades or vanes and particularly to a method for enabling blades to be ground to accurate size.

Due to the irregular contour of turbine blades and due to the necessity of maintaining an extreme degree of accuracy in finishing a blade so as to make it identical to the contour of a master blade, the practice has developed measuring a blade by tedious inspection and then endeavoring to indicate the high spots by marking such regions with a crayon and thereafter manually moving the surface of the blade across a grinding wheel and then remeasuring the blade. Such procedure affords no indication to the operator as to the precise amount of metal to be removed and as a result, repetitious grinding and measuring operations must be performed in an effort to avoid removal of an excessive amount of metal. As a result of the foregoing, a large amount of time has been required for finishing a blade and a high percentage of scrap waste has been experienced, because undersized blades have been rejected.

An object of the present invention is to provide a method by means of which a blade may be so marked upon inspection that the operator can manually grind the surface of the blade to the correct size in a single operation. Thus, the invention seeks to eliminate a multiplicity of inspection operations for each blade and to minimize the scrap loss resulting from grinding and measuring operations as presently performed.

Briefly, the present invention includes a method by means of which the surface of a blade is marked by penetration to the exact depth, with respect to a master blade, so that the operator can visually observe the extent of metal being removed during the grinding operation, and can terminate the operation as soon as all evidence of the penetration marks is removed. The depth of penetration of the surface to be ground is initially determined by affixing the position of a reference plane with respect to a master blade and by correlating the movement of penetration members so that one end of each lies in the reference plane when the opposite end engages the surface of the master blade. The end of each penetration member which is adapted to engage the master blade is pointed and is hardened so that subsequently when the members are brought into contact with the blade to be ground, and when pressure is exerted against the members, the points will penetrate the surface only to the extent necessary to indicate the exact depth of metal to be removed, so as to make the blade conform identically to the contour of the master blade. The invention contemplates the marking of both sides of a blade simultaneously, if desired.

Referring now to the drawings.

Figure 1:
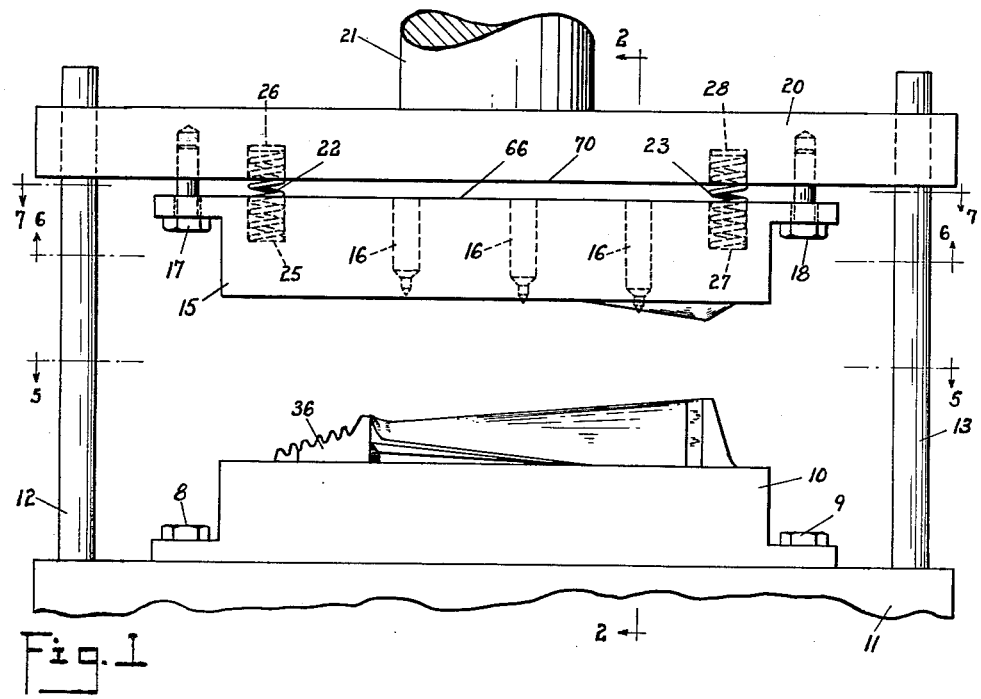
FIG. 1 is a side elevation of a part of a press with which the present invention may be used and showing the press in open position.

In the method illustrated in FIGS. 1 to 8 inclusive, 10 indicates in general a blade holder which is mounted upon the base 11 of a press. Guide bars are shown as being rigidly mounted in the base and as extending vertically therefrom at spaced points. Preferably the guide bars are spaced at the corners of a rectangle, one pair of the bars being indicated at 12 and the other pair being indicated at 13. A holder 15 for marking elements is indicated generally at 16 as being slidably mounted upon stud bolts 17 and 18. The bolts are shown as being attached to a presshead 20 which may be guided for vertical movement upon the bars 12 and 13 by any suitable source of power acting upon a ram 21. The holder 15 and the head plate 20 are normally held out of engagement with each other and in the position shown in FIG. 1 by springs 22 and 23, which may extend into oppositely facing sockets in the holder 15 and head 20 respectively. The sockets for the springs 22 are indicated at 25 and 26 respectively while those for the springs 23 are indicated at 27 and 28 respectively.

Figure 2:
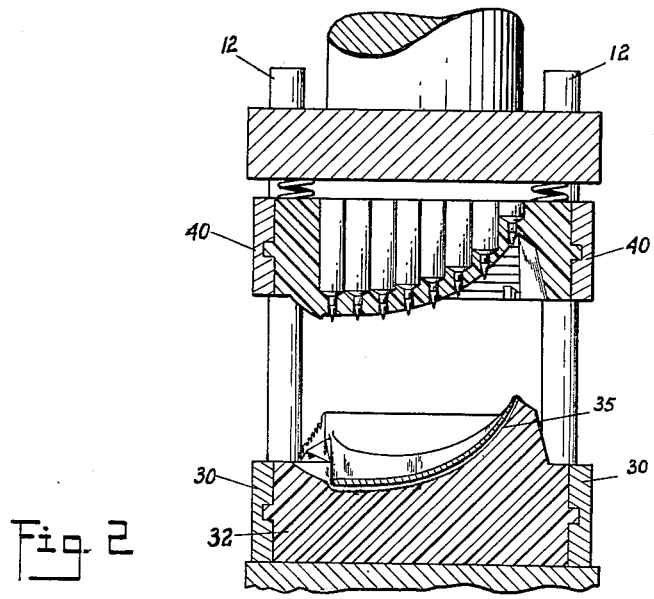
FIG. 2 is a section taken on a plane indicated by the line 2—2 of FIG. 1.
Figure 3:
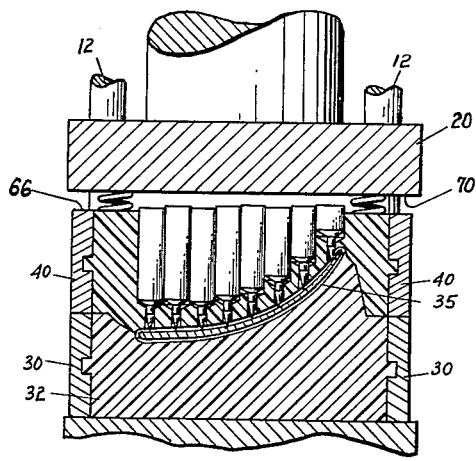
FIG. 3 is a cross sectional view through a part of the press shown in FIG. 1, but illustrating the movable head in contact with the stationary head and illustrating an oversized blade in clamped position between the two holders and prior to the exertion of pressure against the marking members.
Figure 4:
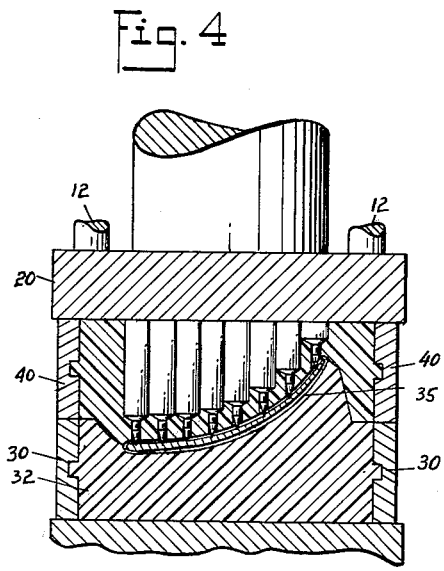
FIG. 4 is a cross section similar to FIG. 3, but illustrating the position of the marking members upon penetration of the blade surface consequent upon exertion of pressure against the marking members.

Preferably the blade holder comprises a hollow frame, which may be rectangular in shape having side walls 30 and end walls 31. The frame preferably is filled with moldable material which hardens when exposed to air after a predetermined length of time. Such material is indicated at 32 and may be that which is sold in the trade under the trademark Devcon. In the illustrations of FIGS. 2, 3 and 4, a blade cavity 35 is provided in the upper surface of the blade holder by pressing a master blade into the material before it sets and becomes hardened.

To form the cavity 35 in the blade holder 10, the master blade is pressed into the moldable material 32 while it is sufficiently soft to yield under pressure. At such time the root 36 of the blade is uncovered but the blade portion is covered with a layer of material, such as masking tape, to a predetermined thickness of about thirty-thousandths of an inch, so that, after removal of the master blade, the clearance between the wall of the cavity 35 and the complementary surface of the master blade will be about thirty-thousandths of an inch. When the master blade is then replaced by an oversized blade which is to be marked, the root of the blade will fit snugly within the cavity which was formed by the root of the master blade.

Figure 8:
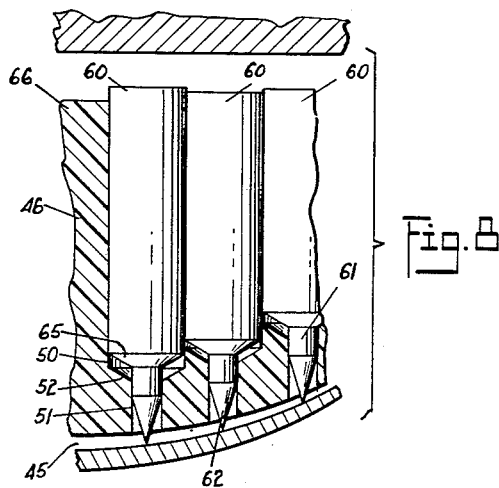
FIG. 8 is an enlarged sectional view taken on a plane indicated by the line 8—8 in FIG. 1 and illustrating the position of the marking members prior to the exertion of pressure thereagainst sufficient to mark the blade.

The marker holder 15 preferably comprises a hollow frame having side walls 40 and end walls 41 and may be filled with moldable material 46 similar to that used for filling the holder 10. By pressing the holder 15, having the moldable material, while still pliable, therein against the master blade within the holder 10, and while the blade portion is covered with a layer of masking tape, as aforesaid, a cavity 45 will be formed in the under surface of the holder 15. This cavity is best shown in FIG. 8. Inasmuch as the root portion of the master blade was not covered with masking tape, the root-receiving portion in the cavity formed in the holder 15 will have a tight form-fitting engagement with the root of a blade to be marked, whereas the blade portion will clear the walls of the cavity 45 because, under normal practice, the oversize blade to be ground will normally not exceed 10 to 15 thousandths of an inch in excess of the master blade.

As shown particularly in FIG. 2, the parting line between the mold sections or holders 10 and 15 deviates from a normal plane surface so as to present the surface to be marked in a satisfactory manner. Preferably, such position is attained when the root of the blade is embedded substantially one-half in the mold 10, and the other half in the mold 15.

To support the marking members 16 within the holder 15 I provide a cylindrical passageway or aperture 50 (FIG. 8) for each marker in the material 46, which extends vertically from the top of the material to a point near the bottom and which communicates with a smaller cylindrical aperture 51, the latter of which has its axis coextensive with the axis of the aperture 50. The apertures are joined preferably by a frustro-conical wall section 52. As shown, the aperture sare arranged in a plurality of rows extending transversely of the blade cavity, as indicated at 52, 53 and 54 respectively, and are spaced together closely.

The markers which are illustrated are designed to occupy the respective apertures in the rows 52, 53 and 54 and each marker may comprise a cylinder 60 (FIG. 8), which is slidably mounted within an aperture 50 and which has a cylindrical extension 61, at the lower end thereof, of a reduced diameter and which is slidably mounted in the associated aperture 51. The end of the extension is pointed, as at 62, and is adapted to project into the cavity 45 and to engage a blade which is positioned between the members 10 and 15. The cylinders 60 and 61 are joined by a frustro-conical wall 65 which is substantially complementary in shape to the wall 52, the latter of which acts as a stop to limit the downward movement of the markers and to retain them within the holder 15, whenever the holder is raised out of contact with the blade holder 10.

To form the markers so that the upper ends thereof will be in a common plane, when the points are in contact with the master blade, the cylinders 60 are initially made to project above the plane 66 of the top of the holder, while the points are resting on the surface of the bare master blade. At such time it is to be understood that the root of the master blade will be clamped between the holders 10 and 15, while the blade portion will be disposed within the cavities of the holders. It is to be understood further that the clearance between the walls 52 and 65 is sufficient to permit the points of the markers to engage the blade surface while the walls 52 and 65 are out of contact with each other.

The foregoing assembly is accomplished before the holders 10 and 15 are attached to the base 11 and head 20 respectively. Thereupon, the holders are clamped together by any suitable temporary hand clamps and the projecting portions of the markers above the refernce plane 66 are ground so as to lie in the same plane as the surface 66. Thus, each marker will have a length such that when the upper end is in the reference plane 66, the point will be in the correct position for contact with the surface of the master blade without penetrating such surface. At the completion of the grinding operation, the holder 10 may then be fastened to the base 11 by fasteners 8 and 9 and the holder 15 may be mounted on the head 10 for movement with respect thereto. The latter assembly is accomplished by the use of fastening members 17 and 18 as aforesaid.

A blade to be marked will be an oversized blade, hence, when it is inserted between the holders and the holders are brought together to the position shown in FIG. 3, the upper ends of the marking members will project above the reference plane 66. Further downward movement of the press head against the force exerted by the springs 22 and 23 will bring the lower surface 70 of the press head into engagement with the projecting ends of the marking members and force them downwardly, thereby penetrating the surface of the blade at spaced points to the precise depth whcih corresponds exactly to the surface of the master blade. This position is shown in FIG. 4.

Figure 5:
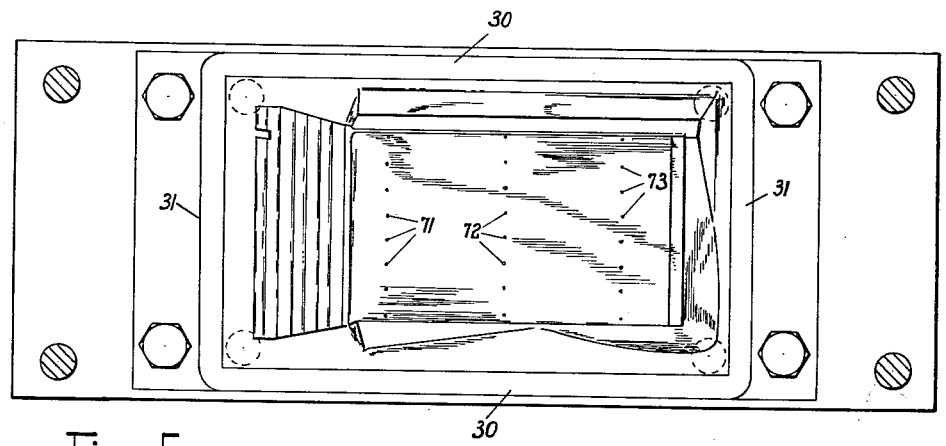
FIG. 5 is a top plan view of the blade in position within the holder as viewed in the direction indicated by the line 5—5 in FIG. 1.
Figure 6:
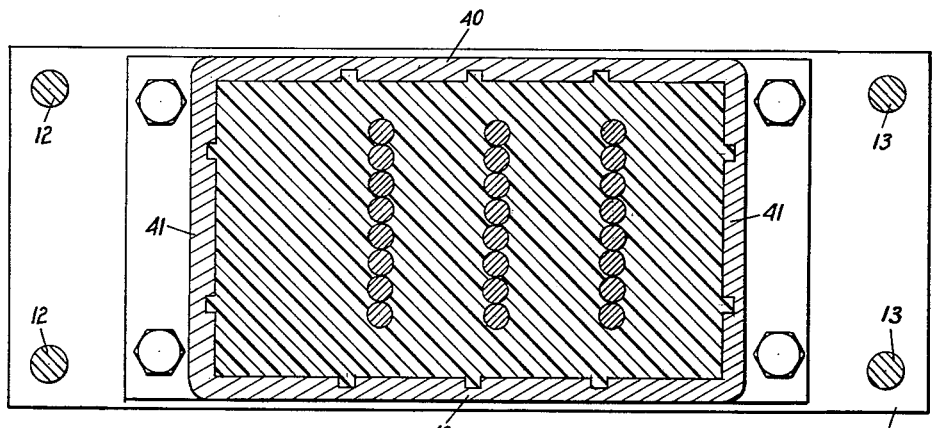
FIG. 6 is a cross sectional view taken on a plane indicated by the line 6—6 in FIG. 1.
Figure 7:
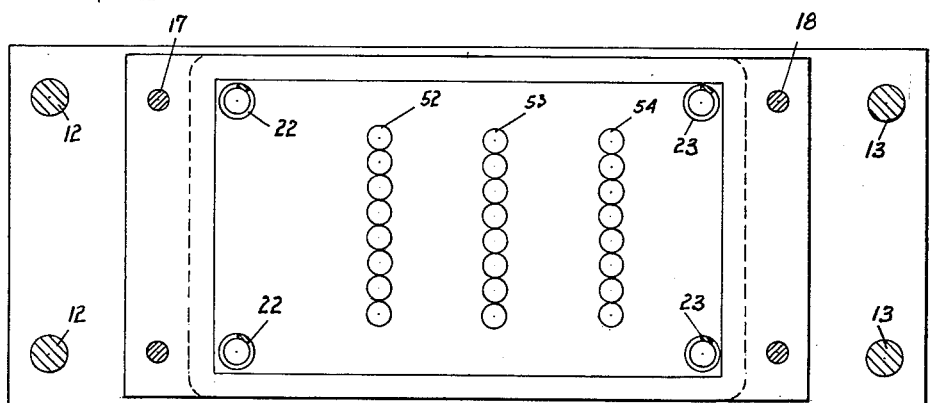
FIG. 7 is a cross sectional view taken on a plane indicated by the line 7—7 in FIG. 1.

Upon lifting the press head, the blade will be found to have been marked by spaced points as indicated by the rows 71, 72 and 73 on FIG. 5. The blade can then be removed from the holder 10 and manually held against a grinding wheel and manipulated by the operator until the punch marks thereon are removed. The surface of the blade will then conform to that of the master blade.

Figure 9:
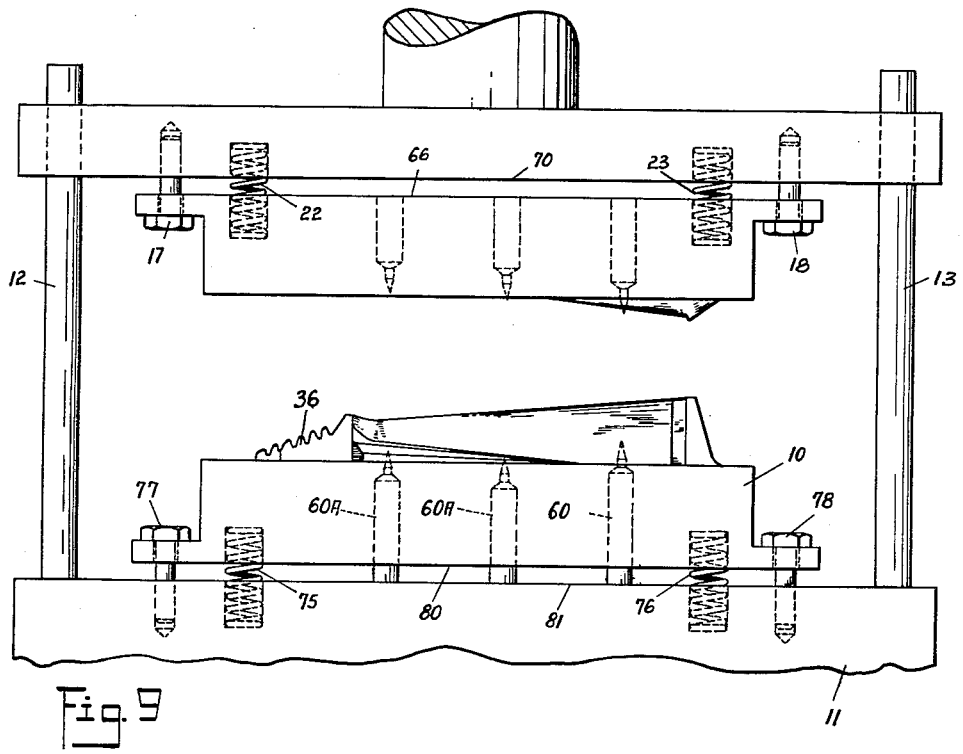
FIG. 9 is a side elevation of a press similar to that of FIG. 1, but illustrating a method for simultaneously marking both sides of a blade.

The foregoing description and illustration in FIGS. 1 to 8 of the drawings are illustrative of a method for marking only one surface of a blade. It is however, within the scope of the invention to duplicate the method shown in such drawings for marking both sides of a blade simultaneously. An example of such method is shown in FIG. 9, wherein parts which correspond to those of FIG. 1 are indicated by the same reference characters. In such illustration the blade holder 10 has marking members 60A which are constructed and positioned in the same manner as those described for the members 60. Preferably, the markers in the holder 10 are equal in number and are disposed oppositely to the markers in the holder 15, so that the pressure exerted against the blade upon marking is uniformly distributed over the blade.

The illustration in FIG. 9 differs additionally from that of FIG. 1 in that the holder 10 is shown as being supported on springs 75 and 76 and as being movably mounted with reference to the base 11 on stud bolts 77 and 78. With this arrangement, it is to be understood that the marking members are initially positioned within the holder 10 with reference to a master blade and to a reference plane 80, so that the ends of the member 60A will lie in the same plane as the surface 80 when the opposite ends thereof are in contact with the surface of a master blade. As a result, the members 60A will have their lower ends beneath the plane 80 at initial contact of the points thereon with the surface of an oversized blade. Upon closing of the press however, so as to force the surface 70 of the head 20 into contact with the surface 66 of the holder 15 and to force the surface 81 of the base 11 into contact with the surface 80 of the holder 10, each marker in the holder 10 will penetrate the underside of the blade to the desired depth, and each marker in the holder 15 will penetrate the upper side of the blade to the desired depth.

Modifications of my invention are shown in FIGS. 10 to 15 inclusive, wherein various forms of marking members are illustrated merely by reference to the holders 10 and 15 respectively, it being understood that the holders will be mounted in a press, as is illustrated in FIG. 1 or 9 as desired. Thus, in FIG. 10 I have shown the plastic material in the holder 15 as being replaced by a metallic plate 85 which is provided with spaced punch points 86 that are arranged in rows extending transversely of the blade, and that are in multiple in each row. The points are spaced apart in each row to correspond to the spacing of the points of the markers illustrated in FIGS. 1 to 8. The plate 86 thus acts as a solid punch which will penetrate the oversized blade to the desired depth. Suitable fastening members 87 may be used for holding the plate 85 within the holder 15.

Figure 10:
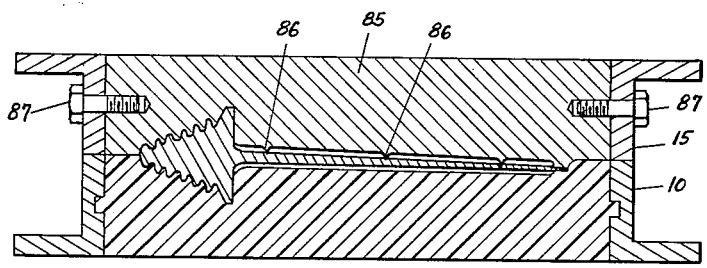
FIG. 10 is a vertical section through a pair of mold members showing a modification of the invention.
Figure 11:
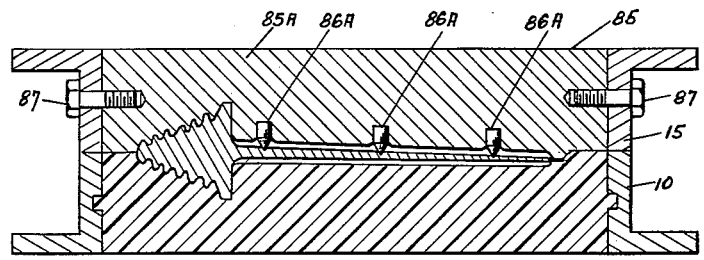
FIG. 11 is a vertical section through a pair of coacting mold members and illustrating another modification of the invention.

In FIG. 10 the points 86 are illustrated as being an integral part of the plate 85. In FIG. 11 however, there is shown a modification wherein the poitns 86A are separate inserts which are fastened, as by a press fit, within apertures in the plate 85A. Such points are spaced similarly to the spacing described in connection with the points 86 of FIG. 10.

Figure 12:
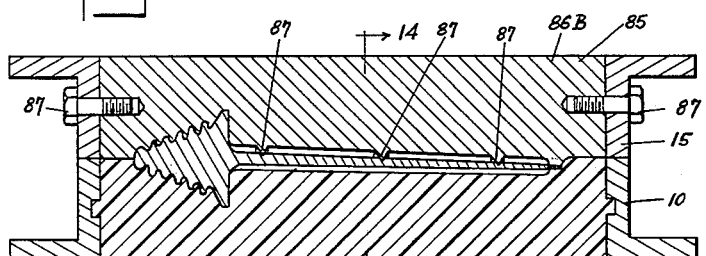
FIG. 12 is a vertical section through a pair of coacting members, illustrating a further modification of the invention.

In FIG. 12 the modification shows a metallic plate 86B, which is similar to the plate 85 except that, instead of spaced points, the markings are made by wedge-shaped ribs 87 which extend in spaced rows transversely of the blade.

Figure 13:
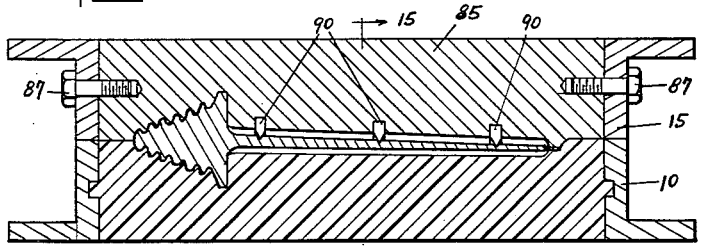
FIG. 13 is a vertical section through a pair of cooperating members and illustrating still another modification of the invention.
Figure 14:
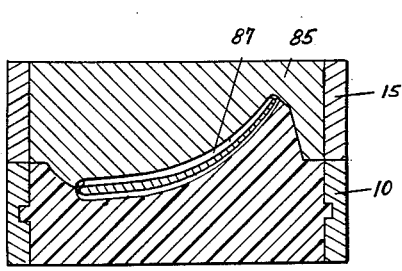
FIG. 14 is a section taken on a plane indicated with a line 14—14 in FIG. 12.
Figure 15:
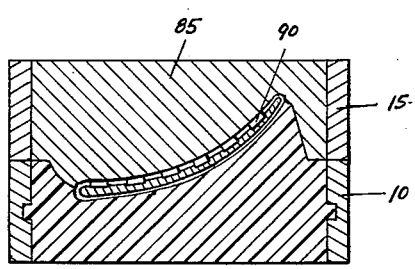
FIG. 15 is a section taken on the plane indicated by the line 15—15 in FIG. 13.

In the modification of FIG. 13, the marking members are wedge-shaped sections 90 which are inserted into the plate, as by a press fit. The sections are inserted in lengthwise abutting engagement with each other and are arranged to make substantially a line impression upon the blade to be marked.

Although the modifications of FIGS. 10 to 15 inclusive illustrate arrangements for marking a blade on only one side thereof, it is within the scope of the invention to duplicate within each holder 10, the construction shown in the holders 15 so as to mark both sides of a blade simultaneously as has been described in connection with FIG. 9.

Figure 16:
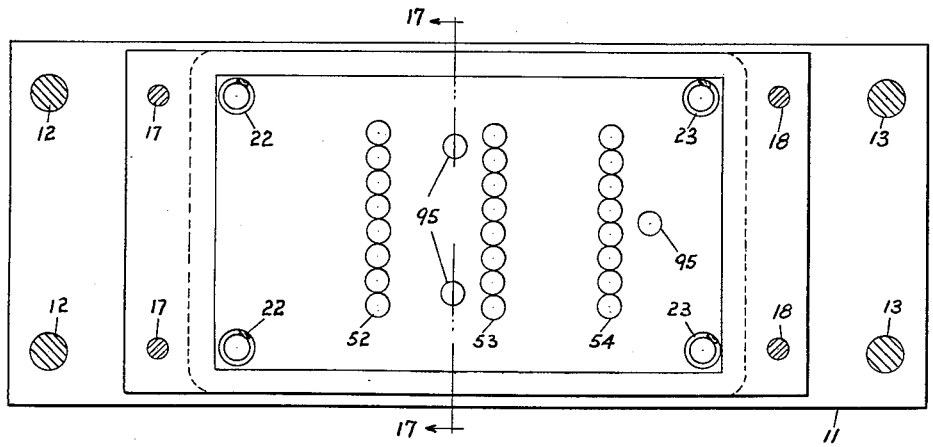
FIG. 16 is a horizontal section taken on a plane similar to that indicated by the line 7—7 in FIG. 1 but showing a modification of the invention.
Figure 17:
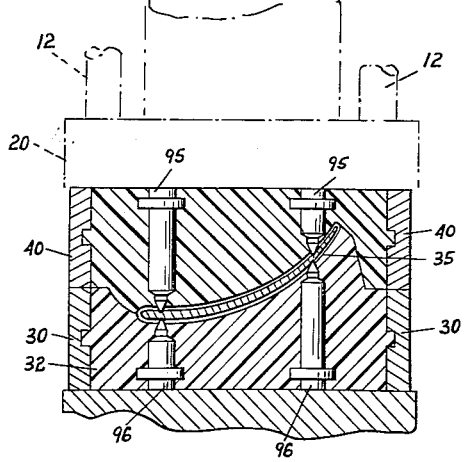
FIG. 17 is a vertical section taken on a plane indicated by the line 17—17 in FIG. 16.

In FIGS. 16 and 17 I have shown a modification of the invention wherein the blade is supported by spaced pins which are embedded in the upper and lower mold sections. The pins are preferably three in number, as indicated at 95 in the upper mold section, and three in number, as indicated at 96 in the lower mold section. The pins 95 are in substantial alignment with the pins 96, and each has a point projecting from the face of the cavity in the associated section, by an amount equal to the distance between the face of the cavity and the surface of the master blade. Preferably the points are hardened and ground to a one-sixteenth inch radius. This will make a small indentation in a blade which is larger than the master blade and thereby hold the blade rigidly in the correct normal position for true alignment with the master blade.

Figure 18:
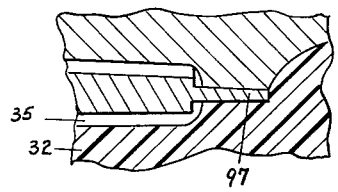
FIG. 18 is a fragmentary sectional detail showing a modification of blade support within the mold.

In FIG. 18 I have shown a blade with a tip at the end opposite the root. This will be embedded within the moldable material in the same manner as the root and clamped by the mold sections. It operates to assist the root in holding a blade firmly within the mold during the marking operation.

An advantage of the present invention is that the guesswork by the grinding machine operator is eliminated, and that the need for repetitious grinding and measuring operations is likewise eliminated, as a result of which a great saving in time, labor and scrap loss is effected. An additional advantage of the invention is the fact that the grinding operation can be performed with relatively unskilled labor and that the operation of marking the blades in preparation for grinding can be performed with relatively inexpensive equipment.

I claim:

1. A method of finishing an oversized metal blade to a predetermined size from a master blade, comprising moving a plurality of yieldable metal probe members into contact with the master blade, establishing a known distance between the surface of the master blade, when positioned in a holder, and a single reference plane spaced from the master blade by correlating the movement of the yieldable metal probe members so that one end of each lies in the single reference plane when the opposite end engages the surface of the master blade, replacing the master blade with the metal blade to be finished, moving the ends of the yieldable metal probe members in the single reference plane simultaneously through the established known distance toward the surface of the metal blade to be finished until the yieldable metal probe members mark the surface by penetration at spaced points to a depth to make the contour of the metal blade to be finished conform to the contour of the master blade, removing the yieldable metal probe members from the surface of the metal blade to be finished and then grinding the surface until the penetration marks disappear.

2. The method according to claim 1, wherein the metal blade to be finished is marked on opposing sides simultaneously.

3. A method of finishing an oversized three-dimensional metal article to a predetermined size from a three-dimensional master article, comprising positioning the master article in a holder, establishing a single reference plane spaced from the surface of the master article when positioned in the holder, moving a plurality of metal probe members into contact with the master article so that one end of each probe member projects above the single reference plane when the opposite end thereof engages the surface of the master article, reducing simultaneously the projecting ends of the respective probe members so that each probe member will have a length such that one end of each lies in the single reference plane when the opposite end thereof engages the surface of the master article, replacing the master article with the metal article to be finished, moving the ends of the metal probe members in the single reference plane simultaneously toward the surface of the article to be finished until the metal probe members mark the surface by penetration at spaced points, removing the metal probe members from the surface of the article to be finished, and then grinding the surface until the penetration marks disappear.

4. A method according to claim 3, wherein the article to be finished is marked on opposite sides simultaneously.

References Cited in the file of this patent

UNITED STATES PATENTS

| 522,567 | Ten Winkel | July 3, 1894 |
|---|---|---|
| 1,338,013 | Haahr | Apr. 27, 1920 |
| 1,771,418 | Pope | July 29, 1930 |
| 2,341,176 | Buehrig | Feb. 8, 1944 |
| 2,410,888 | Lucy | Nov. 12, 1946 |
| 2,782,567 | Opalick | Feb. 26, 1957 |
| 2,855,733 | Allison | Oct. 14, 1958 |
| 2,907,151 | Peterson | Oct. 6, 1959 |

FOREIGN PATENTS

| 725,106 | France | May 9, 1932 |